(12) United States Patent
Fakkema

(10) Patent No.: US 7,966,944 B1
(45) Date of Patent: Jun. 28, 2011

(54) LINEAR SYNCHRONOUS MOTOR RAILROAD TRAIN DRIVEN POWER GENERATING SYSTEM

(76) Inventor: Mark Fakkema, Lauderhill, FL (US)

(*) Notice: Subject to any disclaimer, the term of this patent is extended or adjusted under 35 U.S.C. 154(b) by 226 days.

(21) Appl. No.: 11/635,188

(22) Filed: Dec. 8, 2006

(51) Int. Cl.
*B61C 3/00* (2006.01)

(52) U.S. Cl. .......................... 105/35; 104/281; 104/292

(58) Field of Classification Search .................. 104/281, 104/292; 105/35, 36, 37, 38, 48
See application file for complete search history.

(56) References Cited

U.S. PATENT DOCUMENTS

| | | | | |
|---|---|---|---|---|
| 2,564,121 A * | 8/1951 | Melcher | ............................ | 290/3 |
| 3,678,864 A * | 7/1972 | Gutridge | ......................... | 105/4.1 |
| 3,713,504 A * | 1/1973 | Shimer et al. | ................ | 180/65.1 |
| 4,437,015 A * | 3/1984 | Rosenblum | ................... | 290/1 R |
| 4,472,944 A * | 9/1984 | Chamberlain | ................... | 60/718 |
| 4,614,875 A * | 9/1986 | McGee | ........................... | 290/1 R |
| 4,702,291 A * | 10/1987 | Engle | .............................. | 105/35 |
| 4,998,860 A * | 3/1991 | Dehne | ........................ | 198/750.1 |
| 5,065,581 A * | 11/1991 | Jenkins | ............................ | 60/668 |
| 5,215,156 A * | 6/1993 | Stulbach et al. | ............. | 180/65.3 |
| 5,234,184 A * | 8/1993 | Chew | ............................ | 246/194 |
| 5,590,603 A * | 1/1997 | Lund | .......................... | 104/88.04 |
| 5,590,604 A * | 1/1997 | Lund | .......................... | 104/88.04 |
| 5,598,783 A * | 2/1997 | Lund | .......................... | 104/88.04 |
| 5,735,215 A * | 4/1998 | Tegeler | ........................ | 105/34.1 |
| 5,828,135 A * | 10/1998 | Barrett | ............................. | 290/3 |
| 5,896,017 A * | 4/1999 | Severson et al. | .............. | 312/280 |
| 6,267,062 B1 * | 7/2001 | Hamilton, Jr. | .............. | 105/26.05 |
| 7,231,877 B2 * | 6/2007 | Kumar | ............................. | 105/35 |
| 7,237,492 B2 * | 7/2007 | Inarida | ............................ | 105/35 |
| 2002/0065020 A1 * | 5/2002 | Meek et al. | .................... | 446/444 |
| 2004/0149160 A1 * | 8/2004 | Foesel et al. | ..................... | 105/35 |
| 2006/0005738 A1 * | 1/2006 | Kumar | ............................. | 105/35 |
| 2006/0005739 A1 * | 1/2006 | Kumar | ............................. | 105/35 |

* cited by examiner

*Primary Examiner* — S. Joseph Morano
*Assistant Examiner* — Jason C Smith
(74) *Attorney, Agent, or Firm* — Oltman, Flynn & Kubler

(57) ABSTRACT

A power generating system includes a railroad track configured to define a looped track; a series of railroad cars riding on and extending substantially the full length of the looped track forming a train loop; a drive gear mounted to the train loop and having a gear circumference substantially concentric with the looped track; and several turbine generators secured relative to the ground at the outer periphery of the drive gear, the turbine generators having individual generator pinion gears in meshed driving contact with the drive gear, so that movement of the train loop around the looped track causes the drive gear to rotate the generator pinion gears and thereby operate the turbine generators. The turbine generators preferably are electrically connected by cables to a power station. The train loop and track preferably include electromagnets for propelling the train loop around the looped track, and alternatively includes a diesel locomotive.

11 Claims, 4 Drawing Sheets

LINEAR SYNCHRONOUS MOTOR RAILROAD TRAIN DRIVEN POWER GENERATING SYSTEM

BACKGROUND OF THE INVENTION

1. Field of the Invention

The present invention relates generally to the field of clean and environmentally friendly power generating devices and systems. More specifically the present invention relates to a railroad train driven power generating system including a railroad track configured in a loop, a locomotive and a series of railroad cars riding on and extending substantially the full length of the looped track forming a loop of interconnected railroad cars, a drive gear mounted to and having a gear circumference substantially concentric with the looped track, and a series of turbine generators mounted to the ground along the periphery of the drive gear, the turbine generators having individual generator pinion gears in meshed driving contact with the drive gear, such that as the train moves around the track the drive gear rotates the generator pinion gears and thereby operates the turbine generators. The train preferably is the type lifted from and propelled along a track by electromagnets in the form of linear synchronous motors, or similar motors, mounted and creating an electric field along the track, popularly known as a bullet train. Alternatively, the use of a conventional diesel locomotive and conventional railroad cars riding on wheels on a dual rail track is contemplated. The generators preferably are all electrically connected by cables to a power station.

The drive gear preferably is provided in several drive gear perimeter segments each having a curved perimeter edge with gear teeth and a length substantially matching or longer than the length of an individual railroad car or the locomotive. Each gear perimeter segment is mounted to a corresponding railroad car and to the locomotive so that the curved perimeter edges are directed outwardly. The gear perimeter segments collectively define a composite drive gear.

As a second embodiment, the drive gear is a ring gear having inwardly directed gear teeth extending toward the center of the looped track, and the turbine generators are positioned along the interior of the looped track to mesh with the drive gear. Once again the drive gear preferably is a composite drive gear formed of a series of perimeter segments. The generator cables preferably converge to a power station within the track loop, and alternatively pass underground beneath the railroad track or on poles over the railroad track to a power station outside the track loop.

2. Description of the Prior Art

There have been a variety of designs for electric power stations over the years, some of which convert power from movement of vehicles or vehicle wheels into electricity.

One such prior system is disclosed in Jenkins, U.S. Pat. No. 5,065,581, issued on Nov. 19, 1991 for a power plant and method of production of synchronous commercial electric power using diesel electric locomotives. The locomotives have speed governors which drive generators producing power to electric motors. The electric motors drive railroad axles containing the railroad wheels to move the locomotives and a load. The locomotives apparently are made stationary. This power plant is intended to deliver utility grade electric power such as during periods of peak electric demand.

Melcher, U.S. Pat. No. 2,564,121, issued on Aug. 14, 1951, reveals a power system including individual direct current generators driven by axles of cars or by separate prime mover power sources on individual cars. Barrett, U.S. Pat. No. 5,828,135, issued on Oct. 27, 1998, discloses a railroad car with an axle-mounted electrical generator. Barrett provides drawing power from only a single car axle and delivering it to a single generator which normally would be moving along the track with the car itself, and is thus not well suited to deliver power to a fixed station. Another axle coupled generator system is revealed in Kemmer, et al., U.S. Pat. No. 5,488,287, issued on Jan. 30, 1996, entitled method of producing electrical energy by means of generators and use of the method in vehicles with anti-skid systems.

Stulbach, et al., U.S. Pat. No. 5,215,156, issued on Jun. 1, 1993, teaches an electric vehicle with a downhill electro-generating system for charging storage batteries in the vehicle. As in Barrett and Kemmer, et al., a generator is linked directly or indirectly with the rotating axle of vehicle road wheels. A turns amplifier is intended to multiply the rotation rate of the electro-generating system and increase production capacity of electric power.

McGee, U.S. Pat. No. 4,614,875, issued on Sep. 30, 1986, reveals a vehicle-actuated, roadway electrical generator. A surface over which a vehicle such as an automobile rides is provided with a series of embedded, upright rotor and stator generator assemblies, each such assembly including an externally threaded spindle for reciprocating axially through a matingly rotated yoke carried on the interior of the rotor. As a vehicle wheel rides over the generator assemblies they are depressed in sequence by the weight of the vehicle and generate electricity.

Rosenblum, U.S. Pat. No. 4,437,015, issued on Mar. 13, 1984, discloses a method and apparatus for automobile actuated power generation. A series of rollers are rotatably mounted within lateral channels in a road, the rollers being connected to power generation means. Movement of vehicle wheels or tires over the road causes the rollers to rotate in sequence a certain number of degrees. An accumulator may be provided to steady the delivery of power to a generator for continuous electricity generation.

Additional references include Brittain, Jr., U.S. Pat. No. 2,42,946, issued on Jun. 24, 1947, for a railway journal box, and Morton, U.S. Pat. No. 1,312,131, issued on Aug. 5, 1919 for an automatic rail power system.

It is thus an object of the present invention to provide a power generating system driven by movement of a railroad train about a looped track so that power is generated within a fixed, localized area.

It is another object of the present invention to provide such a power generating system which makes use of any pre-existing railroad train, whether electromagnetic or diesel powered, which can later be placed back on a conventional rail system for ordinary use and thus requires minimal investment in specialized equipment.

It is still another object of the present invention to provide such a power generating system which can be rapidly constructed and easily moved to another location.

It is finally an object of the present invention to provide such a power generating system which is safe, reliable, relatively inexpensive to construct, and which can conform to the spirit as well as the letter of the United States Clean Air Act.

SUMMARY OF THE INVENTION

The present invention accomplishes the above-stated objectives, as well as others, as may be determined by a fair reading and interpretation of the entire specification.

A power generating system is provided, including a railroad track configured to define a looped track; a series of railroad cars riding on and extending substantially the full length of the looped track forming a train loop; a drive gear mounted to the train loop and having a gear circumference substantially concentric with the looped track; and at least one generator secured relative to the ground at the outer periphery of the drive gear, the at least one generator having a generator pinion gear in meshed driving contact with the drive gear, so that movement of the train loop around the looped track causes the drive gear to rotate the generator pinion gear and thereby operate the generator. The generator preferably is electrically connected by a cable to a power station.

The train loop and track preferably include electromagnets for propelling the train loop around the looped track. The train loop alternatively includes a diesel locomotive.

Each railroad car has a car length and the locomotive has a locomotive length, and the drive gear preferably includes several drive gear perimeter segments each having a curved outer perimeter edge with gear teeth and having a length at least substantially equal to one of the car length the locomotive length, each perimeter segment being mounted to a corresponding railroad car so that the curved outer perimeter edge is directed outwardly from the center of the looped track, and the drive gear perimeter segments collectively define a composite drive gear.

A power generating system is further provided, including a railroad track configured to define a looped track; a locomotive and a series of railroad cars riding on and extending substantially the full length of the looped track forming a train loop; a drive gear mounted to the train loop and having a gear circumference substantially concentric with the looped track; and several turbine generators secured relative to the ground at the outer periphery of the drive gear, the turbine generators having individual generator pinion gears in meshed driving contact with the drive gear, so that movement of the train loop around the looped track causes the drive gear to rotate the generator pinion gears and thereby operate the turbine generators. The turbine generators preferably are electrically connected by cables to a power station.

Each railroad car has a car length and the locomotive has a locomotive length, and the drive gear preferably includes several drive gear perimeter segments each having a curved outer perimeter edge with gear teeth and having a length at least substantially equal to one of the car length the locomotive length, each perimeter segment being mounted to a corresponding railroad car so that the curved outer perimeter edge is directed outwardly from the center of the looped track, and the drive gear perimeter segments collectively define a composite drive gear.

The railroad car preferably has an outwardly directed railroad car side and each gear perimeter segment preferably has a substantially perpendicular gear mounting flange for face to face abutment with an outwardly directed railroad car side and a fastening mechanism for fastening the gear mounting flange to the given the outwardly directed railroad car side. The drive gear perimeter segments preferably substantially abut each other end to end so that the generator pinion gears are in substantially continuous contact with and are rotated substantially continuously by the composite drive gear as the train loop moves around the looped track.

A power generating system is further provided, including a railroad track configured to define a looped track; a locomotive and a series of railroad cars riding on and extending substantially the full length of the looped track forming a train loop; a drive gear in the form of a ring gear mounted to and having a gear inner circumference substantially concentric with the looped track; and at least one generator secured relative to the ground at the inner circumference of the drive gear, the at least one generator having a generator pinion gear in meshed driving contact with the drive gear, so that movement of the train loop around the looped track causes the drive gear to rotate the generator pinion gear and thereby operate the generator. The turbine generators preferably are electrically connected by cables to a power station.

Each railroad car preferably has a car length and the locomotive has a locomotive length, and the drive gear includes several drive gear perimeter segments each having a curved inner perimeter edge with gear teeth and having a length at least substantially equal to one of the car length the locomotive length, each gear perimeter segment being mounted to a corresponding railroad car so that the curved inner perimeter edge is directed inwardly toward the center of the looped track, and the drive gear perimeter segments collectively define a composite drive gear.

A power generating system, including a railroad track configured to define a looped track; a locomotive and a series of railroad cars riding on and extending substantially the full length of the looped track forming a train loop; a drive mechanism mounted to the train loop; and at least one generator secured relative to the ground adjacent to the looped track, the at least one generator being in driving contact with the drive mechanism, so that movement of the train loop around the looped track causes the drive gear to drive and operate the generator.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
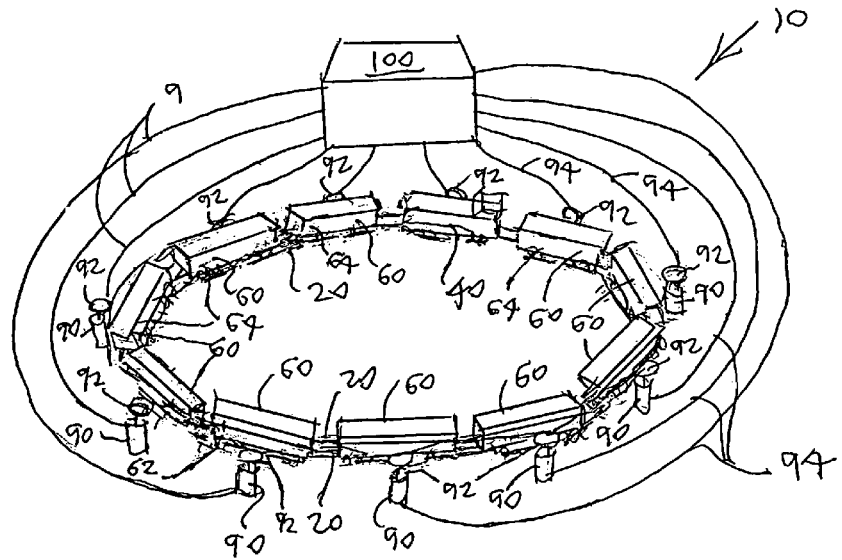
FIG. 1 is a perspective schematic view of the first preferred embodiment of the power generating system where the train is propelled by electromagnets, having the turbine generators along the outer perimeter of the looped track.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiments

Figure 2:
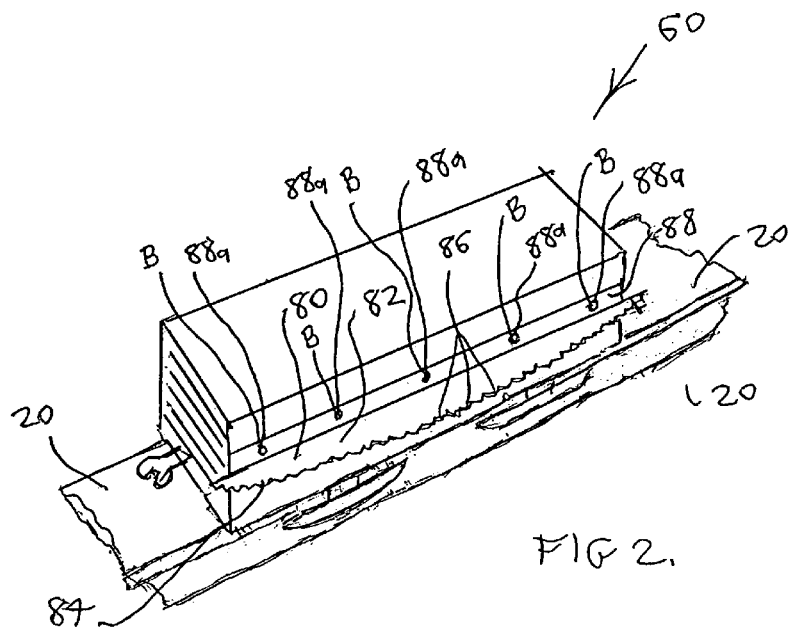
FIG. 2 is a perspective view of a railroad car of FIG. 1 having an drive gear perimeter segment with a perimeter edge mounted to the car outward side shown with the outward curve exaggerated.
Figure 3:
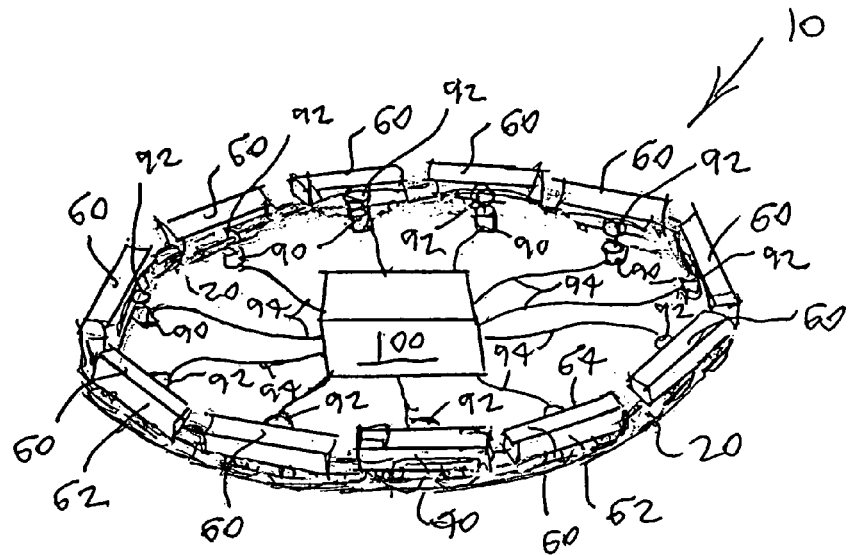
FIG. 3 is a perspective schematic view of the first preferred embodiment of the power generating system as in FIG. 1, having the turbine generators along the inner perimeter of the looped track.
Figure 4:
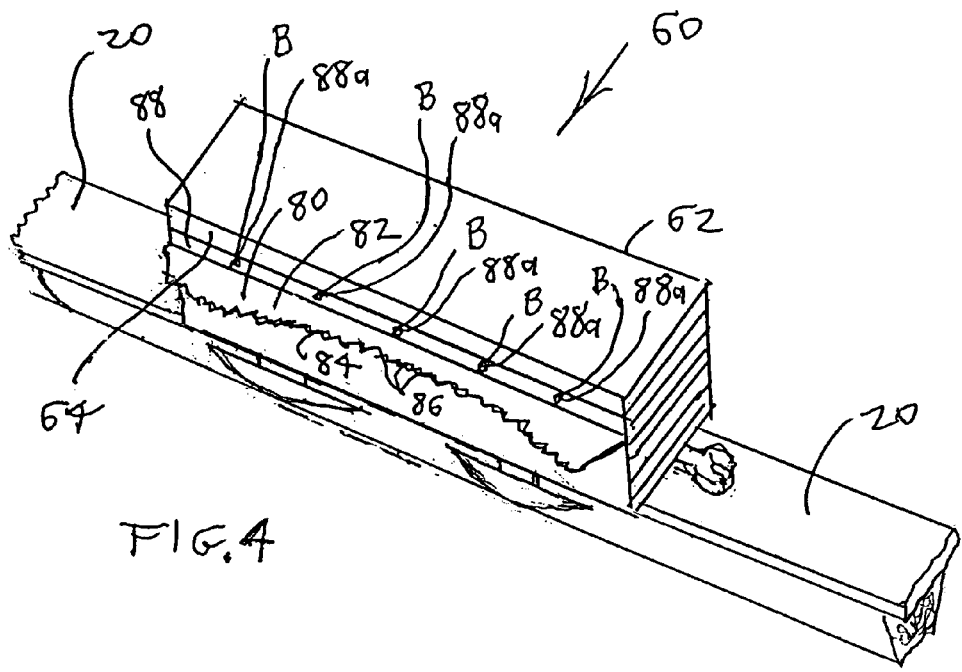
FIG. 4 is a perspective view of a railroad car as in FIG. 1 having an drive gear perimeter segment with a perimeter edge mounted to the car inward side shown with the inward curve exaggerated.
Figure 5:
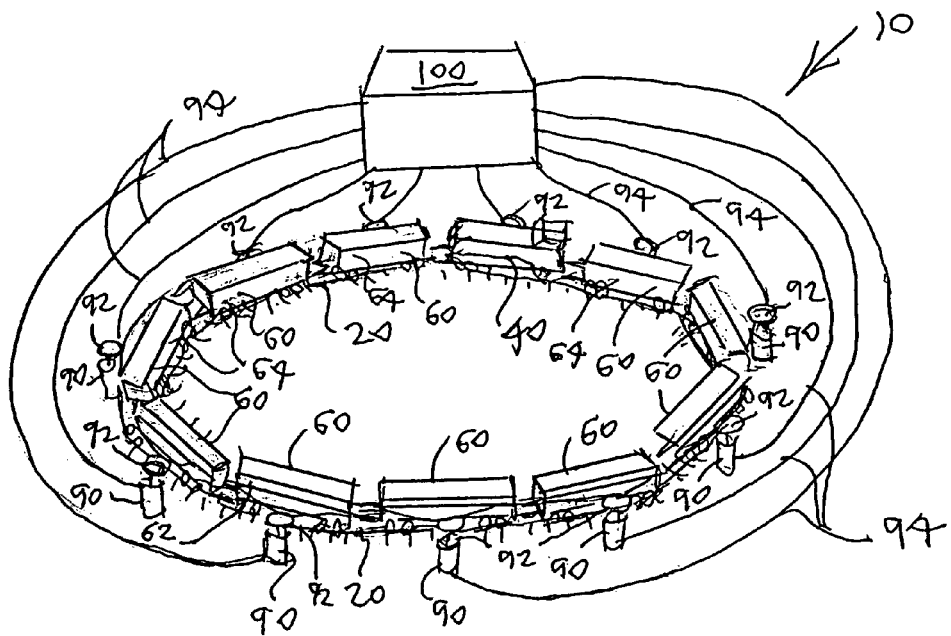
FIG. 5 is a perspective schematic view of the second preferred embodiment of the power generating system where the train includes a diesel locomotive propelling the train along a conventional track, having the turbine generators along the outer perimeter of the looped track.
Figure 6:
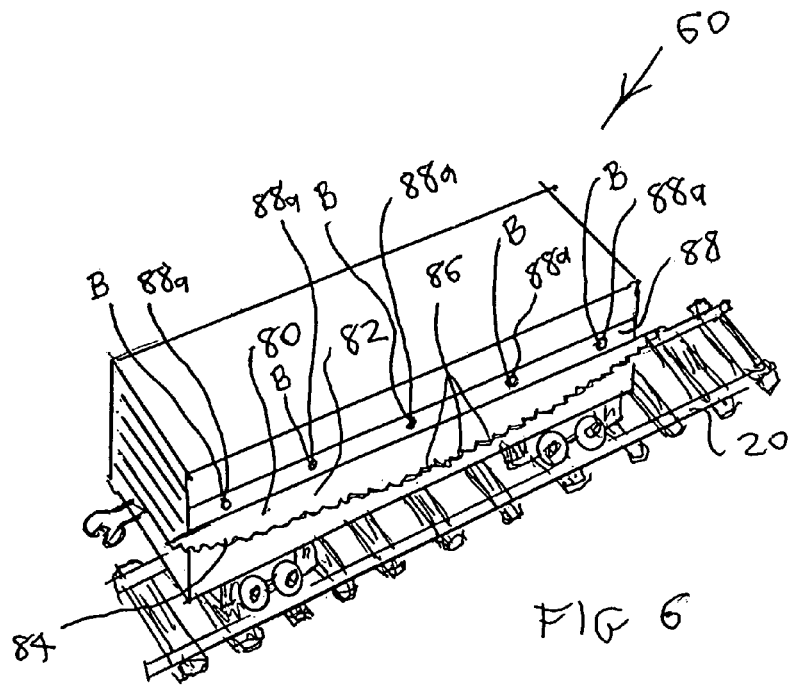
FIG. 6 is a perspective view of a railroad car as in FIG. 5 having an drive gear perimeter segment with a perimeter edge mounted to the car outward side shown with the outward curve exaggerated.
Figure 7:
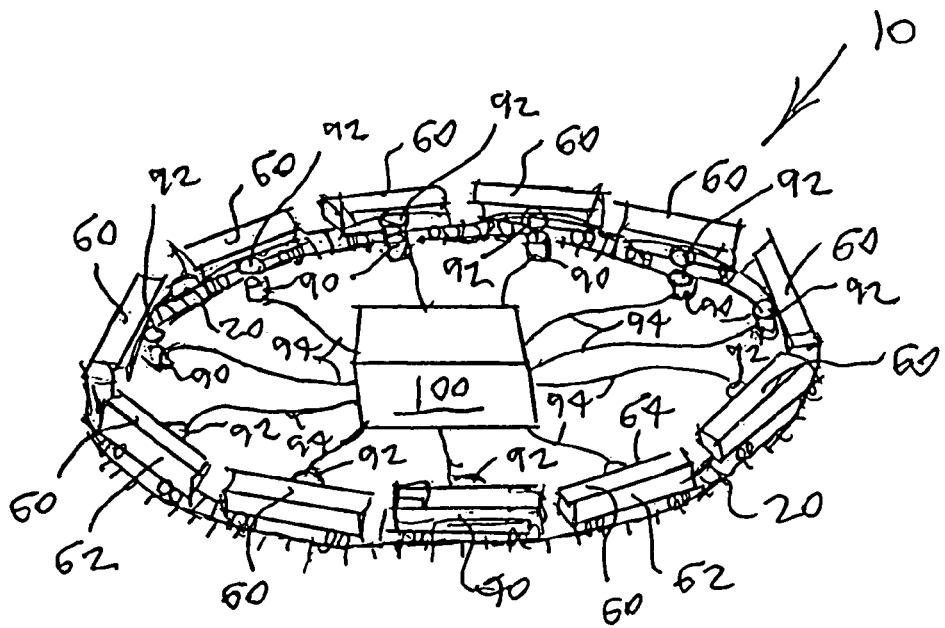
FIG. 7 is a perspective schematic view of the embodiment of the power generating system as shown in FIG. 5, having the turbine generators along the inner perimeter of the looped track.
Figure 8:
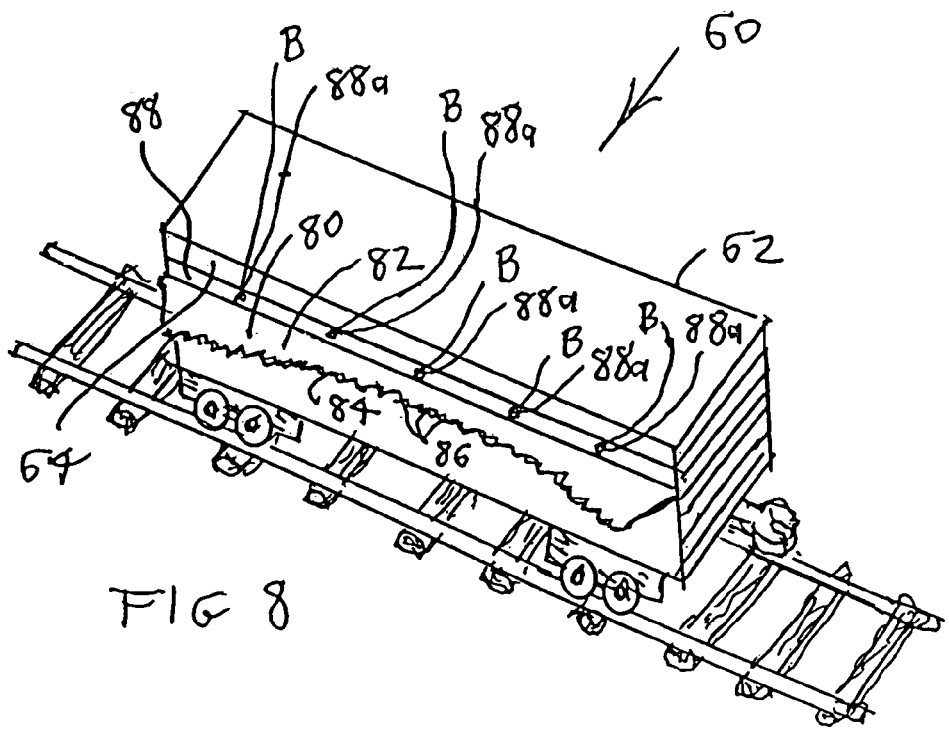
FIG. 8 is a perspective view of a railroad car of FIG. 5 having an drive gear perimeter segment with a perimeter edge mounted to the car inward side shown with the inward curve exaggerated.

Referring to FIGS. 1-8, a railroad train driven power generating system 10 is disclosed including a railroad track 20 configured in a loop, a locomotive 40 and a series of railroad cars 60 riding on and extending substantially the full length of the looped track 20 forming a train loop 50 includes the locomotive 40 and railroad cars 60, a drive gear 80 mounted to and having a gear 80 circumference substantially concentric with the looped track 20, and a series of turbine generators 90 mounted to the ground along the periphery of the drive gear 80, the turbine generators 90 having individual generator pinion gears 92 in meshed driving contact with the drive gear 80. The train forming the train loop 50 preferably is the type lifted from and propelled along a track 20 by electromagnets in the form of linear synchronous motors, or other similar or equivalent motors, mounted and creating an electric field along the track, popularly known as a bullet train. See FIGS. 1-4. Alternatively, the use of a conventional diesel locomotive 40 and conventional railroad cars 60 riding on wheels on a dual rail track 20 is contemplated. See FIGS. 5-8 The turbine generators 90 preferably are all electrically connected by cables 94 to a power station 100. While the locomotive 40 and railroad cars 60 preferably are interconnected through conventional coupling to maintain a fixed spacial relationship with each other, it is also contemplated that locomotive 40 and railroad cars 60 may be disconnected and simply abut each other so that the locomotive 40 pushes rather than pulls the looped series of railroad cars 60.

The drive gear 80 preferably is provided in several drive gear perimeter segments 82, each having an outwardly curved perimeter edge 84 with gear teeth 86 and a length substantially matching or somewhat longer than the length of an individual railroad car 60. Each segment 82 is mounted to a corresponding railroad car 60 so that the curved perimeter edge 84 is directed outwardly from the center of the track 20 loop. The drive gear perimeter segments 82 collectively define a composite drive gear 80. Each gear perimeter segment 82 preferably has a perpendicular gear mounting flange 88 for face to face abutment with an outwardly directed railroad car side 62 of the railroad cars 60 and bolt ports 88a through which bolts B pass into and through the side 62 of the railroad car 60 to mount a gear perimeter segment 82. The drive gear perimeter segments 82 preferably protrude longitudinally beyond the ends of the railroad cars 60 and substantially abut each other end to end so that the generator pinion gears 92 are in substantially continuous contact with and are rotated substantially continuously by the composite drive gear 80 as the train loop 50 moves around the track 20. Alternatively the drive gear perimeter segments 82 are spaced from each other so that the generator pinion gears 92 are in intermittent contact with composite drive gear 80 and thus are rotated intermittently as train loop 50 moves around track 20.

As the train loop 50 moves around the looped track 20 the drive gear 80 rotates and thereby rotates the generator pinion gears 92, operating the turbine generators 90. The electricity produced by the turbine generators 90 preferably is delivered to the substation 100.

Second Preferred Embodiment

As a second embodiment, the drive gear 80 is configured as a ring gear having inwardly directed gear teeth 86 inside the track 20 loop, and the turbine generators 90 are positioned along the interior of the track 20 loop and to mesh with the teeth 86 of drive gear 80. See FIGS. 3-4. Once again drive gear 80 preferably is provided in perimeter segments 82 having mounting flanges 88 fastened to inwardly directed sides 64 of the railroad cars 60. The generator cables 94 preferably pass underground beneath railroad track 20 or on poles (not shown) over railroad track 20 to power station 100.

It is contemplated that drive means other than drive gear 80 may be connected to the train loop 50 to drive generators 90.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A power generating system, comprising:
    a railroad track supported by and substantially fixed in position relative to the ground and configured to define a looped track;
    a locomotive comprising a series of railroad cars riding on said looped track forming a train loop, said locomotive additionally comprising train drive means for moving said train loop along and relative to said looped track and relative to the ground;
    a drive gear mounted to said train loop and having a gear circumference substantially concentric with said looped track;
    and at least one generator supported by and substantially fixed in position relative to the ground at the outer periphery of said drive gear such that said train loop, train drive gear and train drive means move relative to said generator and relative to the ground, said at least one generator having a generator pinion gear in meshed driving contact with said drive gear, such that movement of said train loop around said looped track causes said drive gear to rotate said generator pinion gear and thereby operate said generator.

2. The power generating system of claim 1, wherein said generator is electrically connected by a cable to a power station.

3. The power generating system of claim 1, wherein said train loop and track comprise electromagnets for propelling said train loop around said looped track.

4. The power generating system of claim 1, wherein said train loop comprises a diesel locomotive.

5. A power generating system, comprising:
    a railroad track configured to define a looped track;
    a locomotive and a series of railroad cars riding on and extending substantially the full length of said looped track forming a train loop;

a drive gear mounted to said train loop and having a gear circumference substantially concentric with said looped track;

and at least one generator connected to the ground at the outer periphery of said drive gear such that said train loop moves relative to said generator, said at least one generator having a generator pinion gear in meshed driving contact with said drive gear, such that movement of said train loop around said looped track causes said drive gear to rotate said generator pinion gear and thereby operate said generator;

wherein each said railroad car has a car length, and wherein said drive gear comprises a plurality of drive gear perimeter segments each having a curved outer perimeter edge with gear teeth and having a length at least substantially equal to one of said car length, each said perimeter segment being mounted to a corresponding railroad car such that said curved outer perimeter edge is directed outwardly from the center of said looped track, and wherein said drive gear perimeter segments collectively define a composite drive gear.

6. A power generating system, comprising:

a railroad track configured to define a looped track;

a series of railroad cars riding on and extending substantially the full length of said looped track forming a train loop;

a drive gear mounted to said train loop and having a gear circumference substantially concentric with said looped track;

and at least one generator secured relative to the ground at the outer periphery of said drive gear, said at least one generator having a generator pinion gear in meshed driving contact with said drive gear, such that movement of said train loop around said looped track causes said drive gear to rotate said generator pinion gear and thereby operate said generator;

wherein each said railroad car has a car length and said locomotive has a locomotive length, and wherein said drive gear comprises a plurality of drive gear perimeter segments each having a curved outer perimeter edge with gear teeth and having a length at least substantially equal to one of said car length said locomotive length, each said perimeter segment being mounted to a corresponding railroad car such that said curved outer perimeter edge is directed outwardly from the center of said looped track, and wherein said drive gear perimeter segments collectively define a composite drive gear.

7. A power generating system, comprising:

a railroad track configured to define a looped track;

a locomotive and a series of railroad cars riding on and extending substantially the full length of said looped track forming a train loop;

a drive gear mounted to said train loop and having a gear circumference substantially concentric with said looped track;

and a plurality of generators secured relative to the ground at the outer periphery of said drive gear, said generators having individual generator pinion gears in meshed driving contact with the drive gear, such that movement of said train loop around said looped track causes said drive gear to rotate said generator pinion gears and thereby operate said generators;

wherein each said railroad car has a car length and said locomotive has a locomotive length, and wherein said drive gear comprises a plurality of drive gear perimeter segments each having a curved outer perimeter edge with gear teeth and having a length at least substantially equal to one of said car length said locomotive length, each said perimeter segment being mounted to a corresponding railroad car such that said curved outer perimeter edge is directed outwardly from the center of said looped track, and wherein said drive gear perimeter segments collectively define a composite drive gear.

8. The power generating system of claim 7, wherein each said railroad car has an outwardly directed railroad car side and wherein each said gear perimeter segment has a substantially perpendicular gear mounting flange for face to face abutment with an outwardly directed railroad car side and fastening means for fastening said gear mounting flange to the given said outwardly directed railroad car side.

9. The power generating system of claim 7, wherein said drive gear perimeter segments substantially abut each other end to end such that said generator pinion gears are in substantially continuous contact with and are rotated substantially continuously by said composite drive gear as said train loop moves around said looped track.

10. A power generating system, comprising:

a railroad track configured to define a looped track;

a locomotive and a series of railroad cars riding on and extending substantially the full length of said looped track forming a train loop;

a drive gear in the form of a ring gear mounted to and having a gear inner circumference substantially concentric with said looped track;

and at least one generator secured relative to the ground at the inner circumference of said drive gear, said at least one generator having a generator pinion gear in meshed driving contact with said drive gear, such that movement of said train loop around said looped track causes said drive gear to rotate said generator pinion gear and thereby operate said generator;

wherein each said railroad car has a car length and said locomotive has a locomotive length, and wherein said drive gear comprises a plurality of drive gear perimeter segments each having a curved inner perimeter edge with gear teeth and having a length at least substantially equal to one of said car length said locomotive length, each said gear perimeter segment being mounted to a corresponding railroad car such that said curved inner perimeter edge is directed inwardly toward the center of the looped track, and wherein said drive gear perimeter segments collectively define a composite drive gear.

11. The power generating system of claim 10, wherein said generators are electrically connected by cables to a power station.

\* \* \* \* \*